(12) United States Patent
Li et al.

(10) Patent No.: US 8,205,705 B2
(45) Date of Patent: Jun. 26, 2012

(54) MIDDLE ELECTRIC MOTOR DRIVE UNIT FOR ELECTRIC BICYCLE

(76) Inventors: Ping Li, Tianjin (CN); Qiaojia Tu, Tianjin (CN)

( * ) Notice: Subject to any disclaimer, the term of this patent is extended or adjusted under 35 U.S.C. 154(b) by 0 days.

(21) Appl. No.: 13/051,064

(22) Filed: Mar. 18, 2011

(65) Prior Publication Data
US 2011/0168472 A1 Jul. 14, 2011

Related U.S. Application Data

(63) Continuation of application No. PCT/CN2009/073998, filed on Sep. 17, 2009.

(30) Foreign Application Priority Data

Sep. 18, 2008 (CN) .......................... 2008 1 0151406

(51) Int. Cl.
*B62M 6/20* (2010.01)
(52) U.S. Cl. .................................. 180/206.4
(58) Field of Classification Search ............... 180/206.1, 180/206.4
See application file for complete search history.

(56) References Cited

U.S. PATENT DOCUMENTS

| | | | | |
|---|---|---|---|---|
| 5,375,676 A * | 12/1994 | Takata et al. | ............... | 180/206.4 |
| 5,505,277 A * | 4/1996 | Suganuma et al. | ........ | 180/206.3 |
| 6,152,251 A * | 11/2000 | Nagai et al. | ................... | 180/220 |
| 6,516,908 B2 * | 2/2003 | Tseng | ......................... | 180/206.2 |
| 6,591,929 B1 * | 7/2003 | Tsuboi et al. | ............. | 180/206.4 |
| 7,357,209 B2 * | 4/2008 | Kokatsu et al. | ............ | 180/206.2 |
| 7,370,720 B2 * | 5/2008 | Kokatsu et al. | ............ | 180/206.4 |
| 2005/0039963 A1 * | 2/2005 | Forderhase | ................... | 180/205 |
| 2005/0077096 A1 * | 4/2005 | Kokatsu et al. | ............... | 180/205 |
| 2006/0131091 A1 * | 6/2006 | Lin | .................................. | 180/208 |
| 2008/0061529 A1 * | 3/2008 | Schmautz | ..................... | 280/291 |
| 2008/0108475 A1 * | 5/2008 | Perng | ................................ | 477/4 |
| 2008/0121452 A1 * | 5/2008 | Bon | .............................. | 180/205 |
| 2009/0066053 A1 * | 3/2009 | Yan | .............................. | 280/252 |
| 2009/0211828 A1 * | 8/2009 | Bon | .............................. | 180/205 |
| 2011/0120794 A1 * | 5/2011 | Hobel | ......................... | 180/206.4 |

* cited by examiner

*Primary Examiner* — Tony Winner
(74) *Attorney, Agent, or Firm* — Matthias Scholl P.C.; Matthias Scholl

(57) ABSTRACT

A middle electric motor drive unit for an electric bicycle, including a motor, a controller, a sensor, a gear reducer, a one-way clutch, a chain tightener, and a housing. The middle electric motor drive unit is disposed below a frame of the electric bicycle, and in the vicinity of a pedal shaft thereof. The middle electric motor drive unit is independent from the pedal shaft with respect to functions and structure. The motor is an internal rotor and permanent magnet DC motor. The motor shaft of the motor is parallel to a gear shaft and the pedal shaft. The controller is built-in, and disposed in or on the housing. The sensor is an internal sensor or an external pedal shaft sensor.

12 Claims, 6 Drawing Sheets

Ventilated rib

MIDDLE ELECTRIC MOTOR DRIVE UNIT FOR ELECTRIC BICYCLE

CROSS-REFERENCE TO RELATED APPLICATIONS

This application is a continuation of International Patent Application No. PCT/CN2009/073998 with an international filing date of Sep. 17, 2009, designating the United States, now pending, and further claims priority benefits to Chinese Patent Application No. 200810151406.4 filed on Sep. 18, 2008. The contents of all of the aforementioned applications, including any intervening amendments thereto, are incorporated herein by reference.

BACKGROUND OF THE INVENTION

1. Field of the Invention

The invention relates to a middle electric motor drive unit, and more particularly to a middle electric motor drive unit for an electric bicycle.

2. Description of the Related Art

Electric bicycles are widely used nowadays. Conventional electric bicycles are divided into five types: rear-wheel driven bicycles, front-wheel driven bicycles, front-and-rear driven bicycles, center-shaft driven bicycles and pedal-shaft driven bicycles.

In China, most electric bicycles are rear-wheel driven bicycles that use hub external rotor motors.

Compared with rear-wheel driven bicycles using hub external rotor motors, advantages of the center-shaft driven bicycles comprise: firstly, structure of the bicycle, particularly weight distribution thereof, is reasonable, since drive parts are installed at the center of the bicycle, and thus center of gravity thereof is very low and stability during riding is good; secondly, since no external force from a cyclist and goods carried thereby is applied to a motor shell, hidden dangers, such as breakdown of the housing or a wheel spoked disc or wire, increased noise, and so on, caused by deformation of a housing of the motor, an uneven air gap between a rotor and a stator of the motor, and insufficient material strength of materials are not to occur; thirdly, front and rear shafts/wheels can employ normal front and rear shafts/wheels, which makes disassembly and replacement thereof simple and convenient; fourthly, since an external/internal gear transmission of bicycle can be directly installed, and a mechanical speed variator is disposed in the rear shaft drive, which makes the electric bicycle convenient for use and adjustment, and further improves riding performance under bad conditions such as climbing, head wind, overloading, and so on; fifthly, design of the center-shaft driven bicycle is flexible, and not limited by axial or radial dimension of the front wheel and the rear wheel, which makes the bicycle simple and artistic; sixthly, the center-shaft drive features better tightness and reliability; seventhly, since less metal material is used, the bicycle and the motor are light, which reduces no-load current and light-load current, improves power performance of the electric bicycle, and meets requirements for a light-weight, power-assisted, upscale, and high-efficient electric bicycle.

However, there are several problems with the center-shaft driven bicycle: firstly, since weight and riding force of a rider are directly applied to a housing of a middle motor drive, strength of materials and structure and reliability of the bicycle are poor, and the bicycle features high failure rate; secondly, the bicycle features too large volume, complex structure, high production difficulty and cost, large noise caused by multiple reduction, and low transmission efficiency; thirdly, since a center-to-center distance between the pedal shaft and an center output shaft of the drive is fixed, the minimum wheel diameter that can be selected and used by the bicycle is limited and cannot be changed, which limits application range and flexibility of the middle motor drive, and further affects application and operation comfort of the electric bicycle requiring wide range and diversity of wheel diameter; fourthly, a center-axis torque sensor has a one-way clutch, which features complex structure, and high production difficulty and cost, and has special size, and a normal and cheap flywheel can not be used; fifthly, even if a core sensor based on multi-shaft acceleration measurement is used to replace the pedal-axis torque sensor, it still has problems such as large size, small measurement range, and poor linearity; sixthly, although some bicycles employ motors separately disposed with the pedal shafts, and a single chain transmission technique is used, however, since a flywheel on an output shaft of a motor is engaged with a lower edge at the top of a chain, which reduces the number of teeth of the flywheel engaged with the chain, and work life of the flywheel and the chain, and causes severe abrasion of chain teeth, and small contact angle, in addition, since the flywheel needs to transmit the chain to a chain wheel during operation, if a one-way clutch on the chain wheel is inflexible and chain cannot be transported to the large sprocket, the chain is easily detached, which causes failure of the electric bicycle; moreover, the motor occupies a position of getting on or off the bicycle for a lady, hence the motor is not suitable for a lady's bicycle.

SUMMARY OF THE INVENTION

In view of the above-described problem, it is one objective of the invention to provide a middle electric motor drive unitunit for an electric bicycle that is capable of addressing the above-mentioned problems.

To achieve the above objectives, in accordance with one embodiment of the invention, provided is a middle electric motor drive unitunit for an electric bicycle, comprising a motor, a controller, a sensor, a gear reducer, a one-way clutch, a chain tightener, and a housing, the middle electric motor drive unitunit is disposed below a frame of the electric bicycle, and in the vicinity of a pedal shaft thereof, the middle electric motor drive unitunit is independent from the pedal shaft with respect to functions and structure, the motor is an internal rotor and permanent magnet DC motor, a shaft of the motor is parallel to a gear output shaft and the pedal shaft, the controller is built-in, and disposed in or on the housing, and the sensors is an internal sensor or an external pedal shaft sensor.

In a class of this embodiment, the internal sensor is an acceleration sensor with multi axes.

In a class of this embodiment, the external pedal shaft sensor is a torque transducer or a Hall-effect rotation speed transducer.

In a class of this embodiment, the motor is an internal rotor brushless motor with fractional slot and concentrated windings, a stator core of the motor employs multiple split laminations combined altogether, silicon steel sheets of the stator core are buckled and riveted with each other via a groove on each of the split laminations, and a stator winding is made by wrapping multiple parallel or large-twist-pitch enameled copper wire on a plastic insulation frame.

In a class of this embodiment, the controller is a brushless motor controller with or without a position sensor, disposed in or on the housing, or in an end cover of the motor, and encapsulated with waterproof sealing materials.

In a class of this embodiment, the housing is made of aluminum alloy, magnesium alloy, or aluminum magnesium alloy, the controller is disposed in the housing, and on a separated cover, a ventilated rib is die-casted on outer surface of the housing or the cover corresponding to a position of a high-power device of the controller, and a first circuit board of the controller and the high-power device are disposed in the cover of the controller.

In a class of this embodiment, the gear reducer comprises a reduction gear and a drive gear engaged with each other, both the reduction gear and the drive gear are small module gears, gear profiles of the reduction gear and the drive gear are amended via high displacement or angular displacement, its external tooth profile of top edge and dedendum be amended for the reduction gear and the drive gear, surface of the reduction gear and the drive gear is reinforced via heat treatment, the drive gear is a shaft gear with fewer teeth disposed on an end of a motor shaft, the reduction gear and the drive gear are made of low carbon alloy steel or high-strength alloy steel, surface of the reduction gear and the drive gear is hard gear surface formed by carburization, nitridation, carbonitriding, and surface strengthening, or the reduction gear is made of high-strength engineering plastics, the number of teeth of each of the reduction gear and the drive gear is a prime number, and the teeth of each of the reduction gear and the drive gear are straight teeth or oblique teeth.

In a class of this embodiment, as the teeth of each of gear of motor and the drive gear are oblique teeth, a wave spring washer is disposed at an end surface between the bearing of motor shaft or the gear shaft and the housing, and operates to balance and buffer axial force generated during forward rotation of the motor.

In a class of this embodiment, the internal sensor is a micromechanical single-chip sensor, a chip of the acceleration sensor is welded on a second circuit board, the second circuit board is vertically disposed in a groove of a plastic gear, an angle between an X-axis and a horizontal plane and that between a Y-axis and the horizontal plane are respectively +45° and −45°, a position deviation between a symmetric axis of the X-axis and the Y-axis and a gravity line on a sensor is dependent engaged with the plastic gear, and can be adjusted and aligned via an adjusting pinion.

In a class of this embodiment, the external sensor is disposed in a five-way pipe in the frame of the electric bicycle, and giant magnetostrictive materials or magnetostrictive materials made by electro-deposition or plating, or film made of amorphous magnetic materials or colossal magnetoresistance materials are disposed on surface of part, which on the pedal shaft.

In a class of this embodiment, a backshaft flywheel of the electric bicycle is a conjoined or coaxial parallel flywheel with a fixed chain wheel, and a second chain is connected with another chain wheel with the one-way clutch on an output shaft of the gear reducer, whereby implementing direct transmission of the motor.

In a class of this embodiment, a heat insulation pad is disposed at a connection between a housing of the motor and that of the middle electric motor drive unit, and the heat insulation pad is made of silicon rubber or Teflon.

In a class of this embodiment, the frame is a folding frame made of light alloy, comprising magnesium alloy, aluminum magnesium alloy, or aluminum alloy.

In a class of this embodiment, it further comprises a storage battery being a lithium iron phosphate battery or a lithium manganese battery.

In a class of this embodiment, the gear reducer is lubricated via the grease of single or small amount of diluted lubricant.

In a class of this embodiment, the housing comprises a front cover, a back cover, a controller cover, a motor shell, and an end cover are all made of light alloy or engineering plastics, the housing has a sealing plug operating to leading out wire harness, and multiple grooves are disposed in the surface of the junction of the housing, and sealed with silicon rubber, whereby forming a full-sealing waterproof structure.

Advantages of the invention comprise:

1) since the motor drive is separated from the pedal shaft in terms of structure and functions, the housing of the drive does not bear height of a rider and pedal force, and thus impact force applied to the pedal shaft as the rider gets on/off the bicycle is undertaken by the five-way pipe that is widely used by a normal bicycle, which makes structure of the bicycle more compact and reasonable, and thus more adaptable to ergonomic principle and repairing. In addition, stress generated from the housing of the drive under the action of external force and probability thereof are significantly reduced, and thus work life of the drive part is greatly increased; moreover, complete separation of a power-assisted part of the pedal shaft from the electric drive significantly reduces volume and weight of the middle motor drive, production cost thereof, and production difficulty of the housing mould and relevant components; except for these, the middle motor drive is small in size, which makes design of the bicycle and a transmission system thereof more flexible and suitable for different types of electric bicycles, and production difficulty and cost are further reduced, which makes structure of the frame almost the similar as that of a normal electric bicycle.

2) since the acceleration sensor is disposed on the housing of the middle motor drive, the internal part of the middle motor drive is connected to the controller, whereby forming a small, cheap, and torque-assisted middle driving electric bicycle; moreover, problems with a acceleration sensor of the conventional electric bicycle, such as large size, complex structure, small adjustment range of angle, non-linearity and so on, are solved, adjustment range is increased from ±10° to 360°, and fine adjustment of angle can be facilitated; in addition, the acceleration sensor and the second circuit board thereof are disposed in the groove of the plastic gear, which makes full use of space, and volume of the components are greatly reduced, they can also be disposed on or in the middle motor drive, which reduces production cost thereof, and no extra fixing device is required; finally, an expensive pedal-axis torque sensor is not required, and a normal pedal shaft can be directly disposed in the five-way pipe.

3) the sensor of the invention is not limited by structure and size of the middle motor drive, which makes design of the bicycle more flexible; moreover, the torque sensor is made of giant magnetostrictive materials, magnetostrictive materials, amorphous magnetic materials or colossal magnetoresistance materials via electro-deposition or plating, and features small size and low production cost; outer diameter of the torque sensor is so small that it can be received in the five-way pipe along with a drive coil, a detection coil, and a framework; in addition, the middle motor drive unit of the invention features high mechanical strength and a mature design and production technique, completely eliminates strength problems and hidden danger of the conventional middle motor drive unit, and thus improving solidity and rigidity of the bicycle, and increasing work life thereof.

4) since a brushless internal rotor motor with higher rotation speed is used, first-stage reduction drive with a small reduction ratio can be used, which significantly reduces energy loss at a gear transmission part, and noise generated thereby; in addition, since the motor features high efficiency, and low torque ripple, reluctance torque, and cost, and can be produced automatically in large volume, the electric bicycle of the invention has high electromechanical energy conversion efficiency and good power performance, and is power saving and capable of increasing endurance mileage of the electric bicycle and work life of a storage battery.

Figure 1:
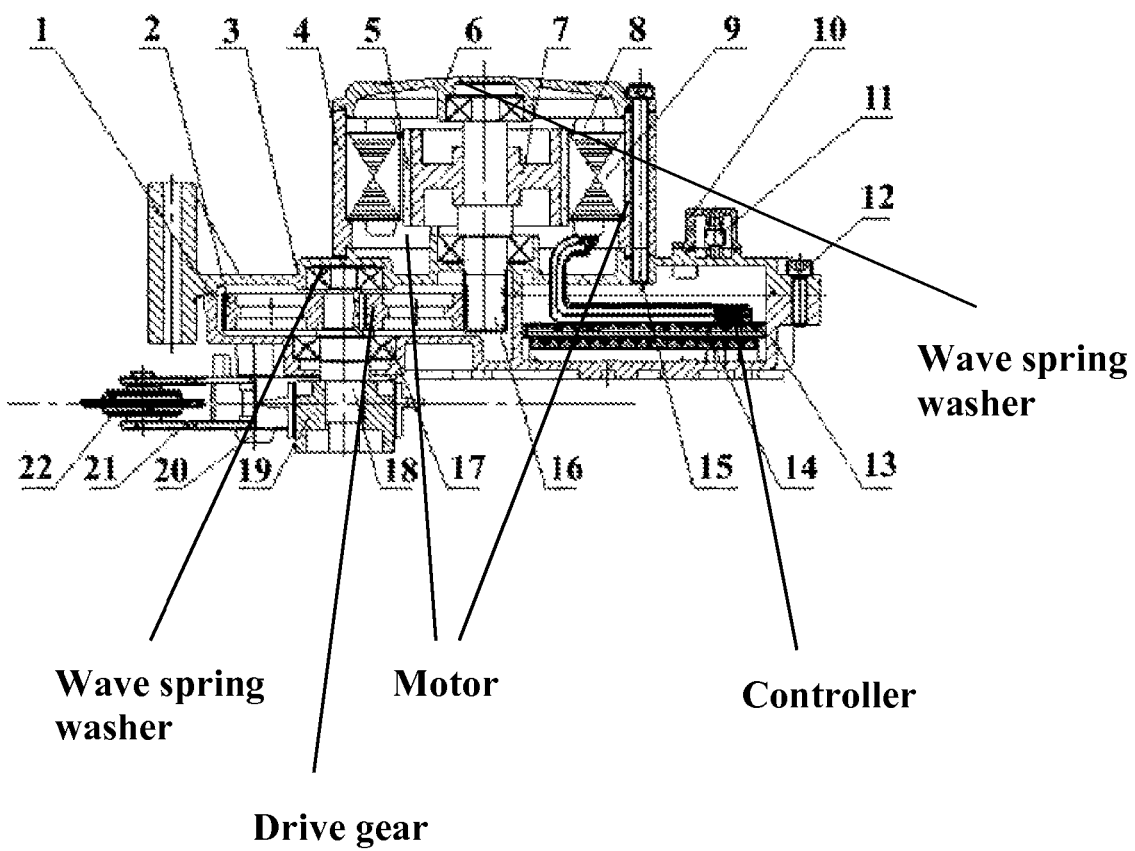
FIG. 1 is a front cross-sectional view of a middle electric motor drive unit for an electric bicycle of an exemplary embodiment of the invention.

In the drawings, the following reference numbers are used: 1. seal; 2. reduction gear; 3. back cover; 4. motor shell; 5. rare-earth permanent magnet tile; 6. end cover; 7. rotor support; 8. stator winding; 9. stator core; 10. sensor cover; 11. adjusting pinion; 12. first screw; 13. front cover; 14. first circuit board; 15. second screw; 16. gear shaft; 17. bearing; 18. output shaft; 19. flywheel of drive; 20. third screw; 21. tension gear support; 22. chain tension gear; 23. gear of sensor; 24. gear shaft cover; 25. second circuit board; 26. back shaft; 27. backshaft flywheel; 28. chain; 29. fixing bracket; 30. chain wheel; 31. frame; 32. pedal component; 33. pedal shaft.

DETAILED DESCRIPTION OF THE EMBODIMENTS

Figure 2:
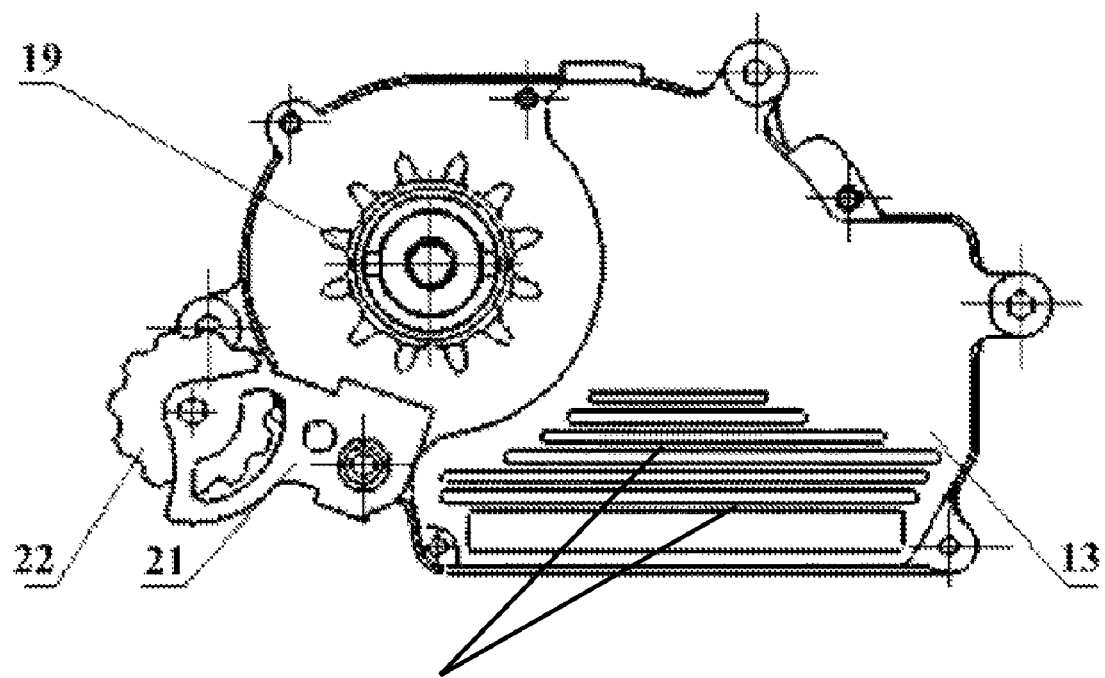
FIG. 2 is a front view of a middle electric motor drive unit for an electric bicycle of an exemplary embodiment of the invention.
Figure 3:
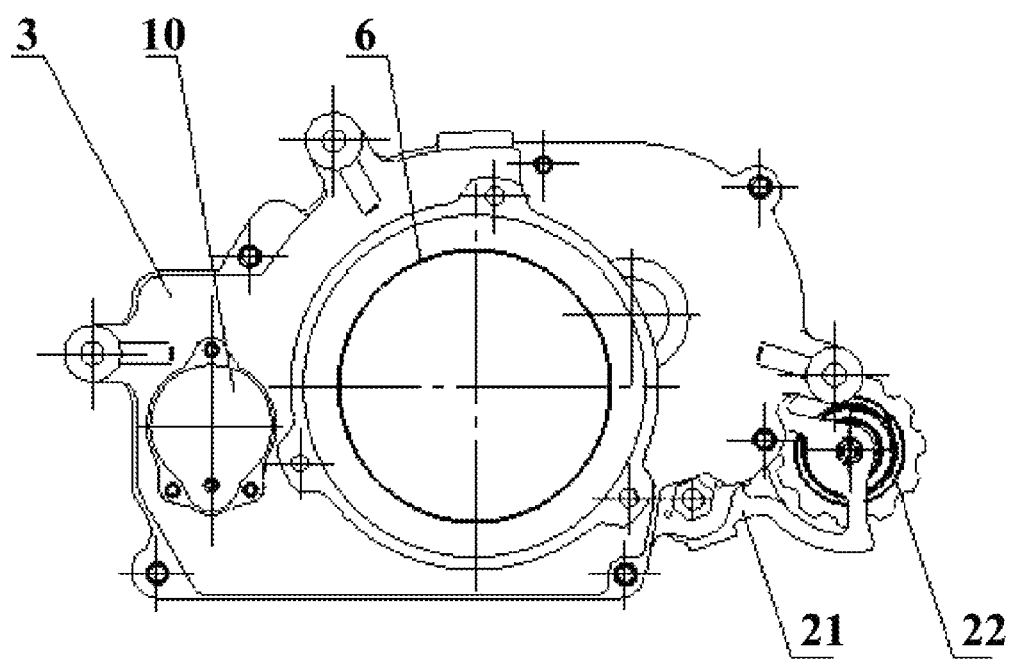
FIG. 3 is a rear view of a middle electric motor drive unit for an electric bicycle of an exemplary embodiment of the invention.

As shown in FIGS. 1-3, a housing of a middle motor drive unit for an electric bicycle comprises a back cover 3, a front cover 13 with a controller, a sensor cover 10, a motor shell 4, and a end cover 6. The back cover 3 are fixed to the front cover 13 via the first screw 12, a seal 1 is disposed at an edge between the back cover 3 and the front cover 13, a first circuit board 14 of the controller is disposed in the housing of the middle motor drive unit.

A rotor and a stator of the motor are disposed in the motor shell 4 and the end cover 6, and the motor is fixed on one side of the back cover 3 via a second screw 15. Multiple rare-earth permanent magnet tiles 5 are distributed on the periphery of a gear shaft 16, and a stator winding 8 is wrapped on a stator core 9.

A gear reducer comprises a reduction gear 2 and a drive gear engaged with each other. The drive gear is disposed at one end of a gear shaft 16. The reduction gear 2 is disposed on an output shaft 18. The output shaft 18 is disposed in the housing of the middle motor drive unit via a bearing 17. A flywheel 19 of the drive having a one-way clutch is disposed on one end of the output shaft 18.

A tension gear support 21 is fixed on outside of the front cover 13, and a chain tension gear 22 is disposed on the tension gear support 21 and engaged with the flywheel 19 of the drive, and operates to strain a chain 28.

An internal sensor is encapsulated on outside of the back cover 3 via the sensor cover 10. In this embodiment, the internal sensor is an acceleration sensor.

Figure 4:
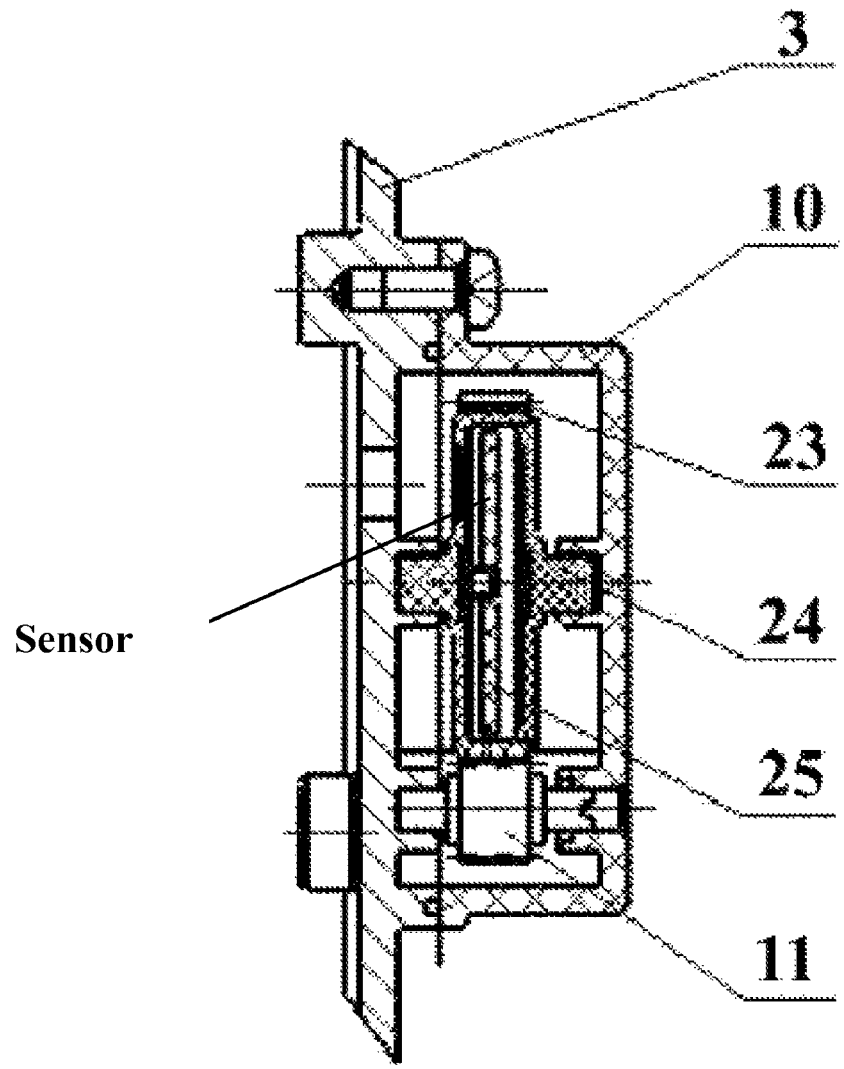
FIG. 4 is a cross-sectional view of an acceleration sensor of a middle electric motor drive unit.

As shown in FIG. 4, an adjusting pinion 11, a gear 23 of a sensor, a gear shaft cover 24, and a second circuit board 25 are disposed in the sensor cover 10.

Figure 5:
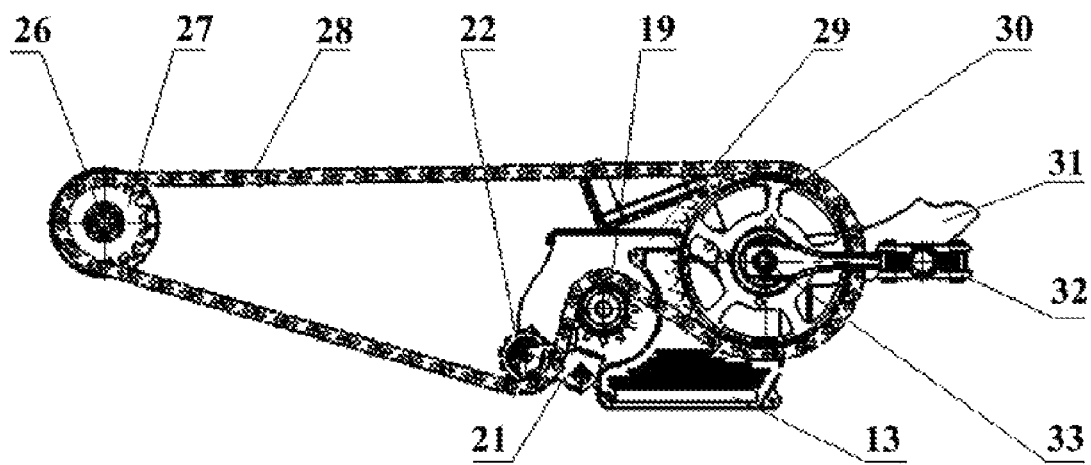
FIG. 5 is a schematic view of a transmission system of a middle electric motor drive unit.
Figure 6:
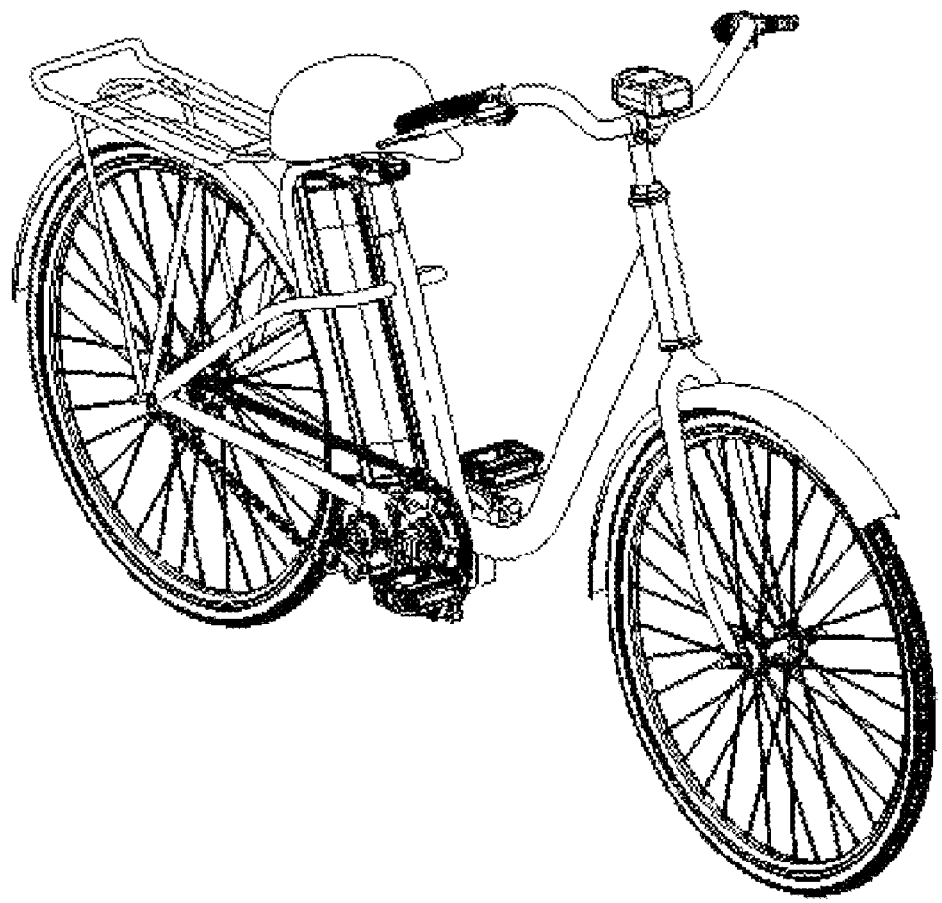
FIG. 6 is a side view of an electric bicycle without a chain cover.

As shown in FIG. 5, the middle motor drive unit is fixed on a frame 31 via a fixing bracket 29, and the chain 28 is sequentially wrapped on a backshaft flywheel 27, the chain tension gear 22, the flywheel of the drive 19, and a chain wheel 30. The backshaft flywheel 27 is disposed on a backshaft 26, and the chain wheel 30 is disposed on a pedal shaft 33. A pedal component 32 is fixed on the pedal shaft 33.

The middle motor drive unit is fixed via the fixing bracket 29 below the frame 31, so that the flywheel of the drive 19, the chain wheel 30, the backshaft flywheel 27, and the chain tension gear 22 are in the same plane, driving torque of the motor and foot torque of a rider are transferred to the backshaft flywheel 27 via the chain 28, and thus electric drive, manual drive, or combination thereof is implemented with one-way clutch transmission of the flywheel. The structure ensures the flywheel 19 of the drive on the output shaft of the drive and the chain wheel 30 are both in appropriate positions, the bicycle operates normally, and the chain 28 is not to be detached.

The first circuit board 14 is disposed in the housing of the middle motor drive unit, and operates to prevent water and dust, and to effectively dissipate heat, and thus greatly improving reliability of the controller and increasing work life thereof. Since the first circuit board 14 is separated from the pedal shaft 33 and has an electromechanical integration structure, structure thereof small and compact, and raw materials are significantly saved and production cost is reduced. An output wire of the controller is connected to the motor at the shortest length, ohmic loss of the wire under large current is greatly reduced, and thus overall efficiency of the electric bicycle is efficiently improved. Since the middle motor drive unit is separated from the five-way pipe and the torque sensor disposed therein, structure and weight distribution of the electric bicycle are reasonable, distance between the pedal component and the ground is more suitable, and riding of the electric bicycle is more stable and comfortable.

The invention employs a medium speed motor, and reduces the number of stages of reduction gears, and that of mechanical components such as gears, shafts and bearings, which significantly reduces production cost and greatly improves overall efficiency of the system. The maximum operation efficiency of the middle motor of the invention is above 86%, and that of the middle motor drive unit is above 82%. The electric bicycle of the invention uses a 36V10AH-type storage battery with endurance mileage of 60 kilometers.

Compared with conventional wheel-hub motors, the drive of the invention features small size, light weight, and good climbing capacity, because torque thereof is increased via the gear reducer. Compared with 205-type low speed brushless hub motors that are widely used at the market, total weight of the middle motor drive unit of the invention is only 3.2 kg, which is reduced by 3 kg (approximately 50%). Compared with 205-type aluminum wheel-hub motors, total weight of the middle motor drive unit of the invention is reduced by 4 kg (approximately 56%). Thus, the invention saves resources, and especially metal materials, and is a green product.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A middle electric motor drive unit for an electric bicycle having a pedal shaft and a frame, comprising
   a motor having a motor shaft;
   a controller;
   a sensor;
   a gear reducer comprising a reduction gear and a drive gear engaged with each other;
   a tension gear support;
   a chain tension gear; and
   a housing;
   an output draft;
   an output-draft bearing;
   wherein
   said middle electric motor drive unit is disposed below said frame, and is disposed beside said pedal shaft;
   said middle electric motor drive unit is independent from said pedal shaft with respect to functions and structure;
   said motor is an internal rotor and permanent magnet DC motor;
   said motor is disposed in said housing;
   said output shaft is disposed in said housing via said bearing;
   said motor shaft is parallel to said output shaft and said pedal shaft;
   said controller is built-in, and disposed in or on said housing;
   said reduction gear is disposed on said output shaft;
   said drive shaft is disposed on an end of said motor shaft; and
   said sensor is an internal sensor having two axes, wherein angle between one of said two axes and a horizontal plane is +45°, and angle between the other of said two axes and said horizontal plane is −45°.

2. The middle electric motor drive unit of claim 1, wherein said internal sensor is an acceleration sensor.

3. The middle electric motor drive unit of claim 1, wherein said gear reducer is a single reduction gear lubricated via grease or small amount of diluted lubricant.

4. The middle electric motor drive unit of claim 1, wherein
   said housing comprises a front cover, a back cover, a controller cover, a motor shell, and an end cover all made of light alloy or engineering plastics;
   said front cover covers a front part of the unit, the back cover covers a back part of the unit, said controller cover covers said controller, said motor shell covers said motor, and said end cover covers an end part of the unit; and
   said housing has a sealing plug operating to leading out wire harness.

5. The middle electric motor drive unit of claim 1, wherein said controller is a brushless motor controller, is disposed in or on said housing, or in an end cover of said motor, and is encapsulated with waterproof sealing materials.

6. The middle electric motor drive unit of claim 1, wherein
   said housing is made of aluminum alloy, magnesium alloy, or aluminum magnesium alloy;
   said controller is disposed in said housing, and on a separated cover;
   a ventilated rib is die-casted on outer surface of said housing or said cover; and
   said controller comprises a first circuit board and a cover;
   said first circuit board of said controller is disposed in said cover.

7. The middle electric motor drive unit of claim 1, wherein
   both said reduction gear and said drive gear are small module gears;
   surfaces of said reduction gear and said drive gear are reinforced via heat treatment;
   said drive gear is a shaft gear with fewer teeth disposed on an end of said motor shaft;
   said reduction gear and said drive gear are made of low carbon alloy steel or high-strength alloy steel;
   surfaces of said reduction gear and said drive gear are hard gear surfaces formed by carburization, nitridation, carbonitriding, and surface strengthening, or said reduction gear is made of high-strength engineering plastics;
   a number of teeth of each of said reduction gear and said drive gear is a prime number; and
   said teeth of each of said reduction gear and said drive gear are straight teeth or oblique teeth.

8. The middle electric motor drive unit of claim 7, wherein a wave spring washer is disposed between a bearing of said motor shaft and said the housing, and operates to balance and buffer axial force generated during forward rotation of said motor.

9. The middle electric motor drive unit of claim 1, wherein
   said internal sensor is a micromechanical single-chip sensor; and
   a chip of said acceleration sensor is welded on a second circuit board.

10. The middle electric motor drive unit of claim 1, wherein giant magnetostrictive materials or magnetostrictive materials made by electro-deposition or plating, or film made of amorphous magnetic materials or colossal magnetoresistance materials are disposed on surface of said part of pedal shaft.

11. The middle electric motor drive unit of claim 1, wherein a backshaft flywheel of said electric bicycle is a conjoined or coaxial parallel flywheel with a fixed chain wheel.

12. The middle electric motor drive unit of claim 1, wherein said frame of the electric bicycle is a foldable frame made of light alloy, comprising magnesium alloy, aluminum magnesium alloy, or aluminum alloy.

* * * * *